T. E. ADKINS.
GREASE CUP.
APPLICATION FILED APR. 22, 1920.
1,373,991.  Patented Apr. 5, 1921.
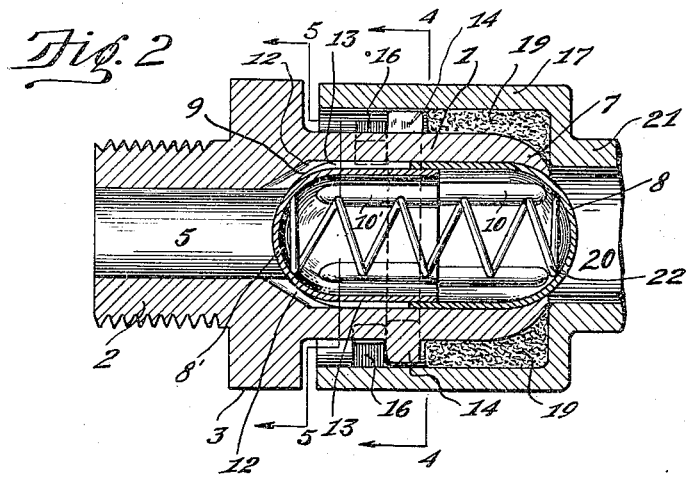
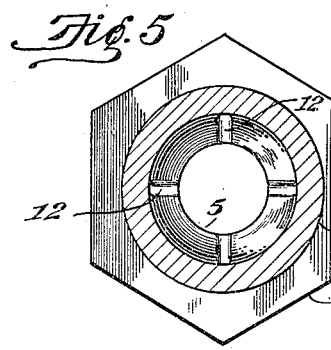
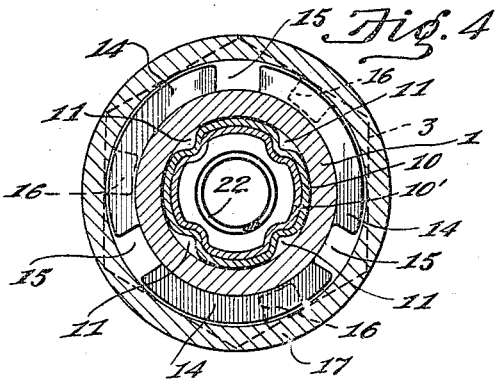
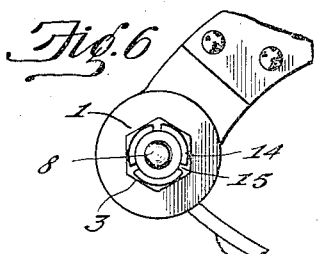
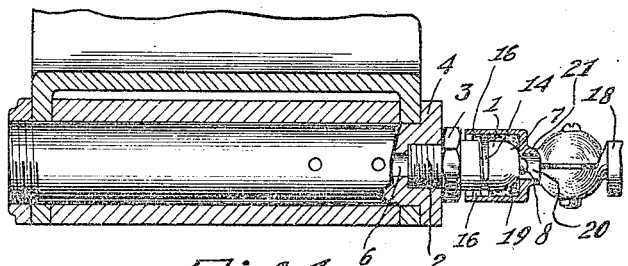
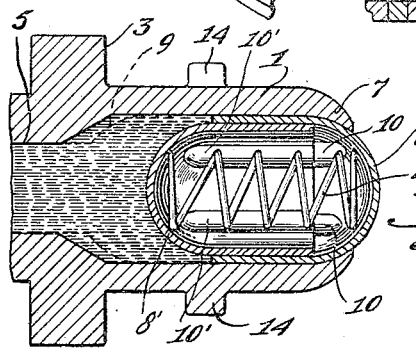
INVENTOR
Thomas E. Adkins
BY Frease, Merkel, Saywell & Bond
ATTORNEYS.

UNITED STATES PATENT OFFICE.

THOMAS E. ADKINS, OF CANTON, OHIO.

GREASE-CUP.

1,373,991.   Specification of Letters Patent.   Patented Apr. 5, 1921.

Application filed April 22, 1920.  Serial No. 375,741.

*To all whom it may concern:*

Be it known that I, THOMAS E. ADKINS, a citizen of the United States, residing at Canton, in the county of Stark and State of Ohio, have invented certain new and useful Improvements in Grease-Cups, of which the following is a specification.

The invention relates to grease cups for use on shackle bolts or other bearing parts requiring continuous lubrication; and the object of the improvement is to produce a cup through which the cavity of the bolt or other receptacle may be readily filled from a grease gun, and which when filled will automatically retain the grease in the receptacle and continue to force or feed the same therein.

When the hollow of a shackle bolt or other grease receptacle is filled with grease and a portion of the same is used upon the bearing, difficulty is experienced from a failure of the grease in the reservoir to follow the used portion to the bearing surface; and this difficulty is overcome by providing a valve in the grease cap composed of a spring controlled extensible capsule, which will be contracted in length when the receptacle is filled and will then extend to force or feed the body of grease into the receptacle.

The invention may be embodied in a preferred form thereof illustrated in the accompanying drawings forming part hereof, in which—

Figure 1 is a longitudinal section of a shackle bolt showing a grease cup thereon and the socket of a feed tube connected therewith;

Fig. 2, a longitudinal section of the grease cup and feed socket;

Fig. 3, a longitudinal section of the grease cup filled with grease;

Fig. 4, a section of the cup on line 4—4, Fig. 2;

Fig. 5, a section of the cup on line 5—5, Fig. 2; and

Fig. 6, a fragmentary end elevation of a shackle bolt showing an end view of the grease cup thereon.

Similar numerals refer to similar parts throughout the drawings.

The grease cup 1 is cylindrical in general form with a tubular screw shank 2 on its inner end and a nut flange 3 forming a shoulder for screwing against the end of the shackle bolt 4, so that the hollow 5 of the stem will register with the hollow 6 of the bolt.

The wall of the cup 1 is originally made truly cylindrical for the entrance of the capsule, with its rim portion 7 tapered externally so as to be readily deflected inward to form a valve seat for the outer end of the capsule, as shown in Figs. 2 and 3.

The capsule is composed of two similar cylindric cups 8 and 8' having their open ends telescoped one within the other and their closed ends preferably rounded in semi-spherical form. The wall of the outer capsule cup 8 slidably fits neatly within the wall of the grease cup and the peripheral portion of its semi-spherical end forms a valve seating in the contracted rim portion of the cup; while the wall of the inner cup 8' slidably fits neatly within the wall of the outer cup and its semi-spherical end normally seats against the annular bearing 9 formed by the hollow 5 of the stem in the bottom of the cup.

Corresponding longitudinal corrugations 10 and 10' are formed in the cylindrical walls of the cups and these corrugations form ducts 11 along the walls of the cup for the passage of grease when the round end of the outer cup is forced inward from its seat in the rim 7 of the cup; and a plurality of grooves 12 are provided in the bottom of the cup for the passage of grease into the hollow 5 of the stem when the inner cup is seated on the annular bearing 9 in the bottom of the cup; it being understood that the annular channel 13 around the wall of the inner cup, formed by the thickness of the wall of the outer cup, permits the grease to pass from the duct 11 to the grooves 12 when the same are not in alinement.

A plurality of external annular integral flanges 14 are provided on the grease cup with intervening notches 15, which notches are adapted to pass the integral lugs 16 provided on the inside of the feed socket 17 which is connected with the end of the feed tube 18 leading from a grease gun, not shown, or other source of forced supply; and the inner sides of the flanges 14 are preferably beveled as shown in Fig. 1, so that when the lugs 16 have passed through the notches 15 to the inner side of the flanges, a turning of the socket upon the grease cup will draw and clamp the parts together by the bayonet joint thus formed. The use of the external annular integral flanges on the grease cup, prevents a loosening of these elements of the bayonet joint by the vibrations of the machine which carries the cup or by other exigencies of its use.

The annular packing 19 is provided in the bottom of the feed socket 17, which packing is shaped to fit around the tapered end of the grease cup and to extend along the sides thereof to the flanges 14 when entered therein; which packing may be secured in the socket by means of liquid glass or other suitable cement, and constitutes a bearing or seat against which the end of the cup is clamped by means of the bayonet joint, to form an air tight connection between the socket and the cup. The hollow 20 in the tubular stem 21 of the feed socket, which communicates with the feed tube 18, is slightly larger than the opening in the end of the grease cup so that the closed end of the outer capsule cup may protrude freely from the end of the cup when the parts are in normal position, as shown in Fig. 2. The two cups of the capsule are held extended against their respective seats, by means of the coiled compression spring 22 located within the capsule; which is the position of the parts for filling the grease receptacle by a grease gun or the like.

By these means it is evident that when grease is supplied under pressure through the hollow 20 in the tubular stem 21 of the feed socket, the same first presses the outer capsule cup 8 inward from its seat in the rim 7 of the cup, thus permitting grease to enter around the capsule cups and to find its way along the ducts 11 formed by the corrugations therein, and thence through the grooves 12 into the hollow 5 of the stem of the cup, and on into the hollow 6 of the shackle bolt or other receptacle for the lubricant.

While the receptacle is being filled the spherical end of the inner capsule cup bears against the annuular seat 9 in the bottom of the grease cup, but when the hollow of the shackle bolt and the stem of the grease cup are entirely filled the pressure of the grease upon the ends of both the capsule cups causes the same to telescope, one within the other; whereupon the feed socket is disconnected from the grease cup, and upon being withdrawn therefrom the back pressure or suction draws the connected capsule outward against the seat formed by the rim of the cup as shown in Fig. 3, and the suction likewise operating between the packing 19 and the wall of the cup, wipes the free grease from the end of the cup.

I claim:—

1. A grease cup having a valve seat at its rim and a supporting seat in its bottom, and an extensible capsule comprising two similar telescoping cups with valve forming ends and a compression spring within the capsule normally holding the ends of the capsule cups against the seats, there being longitudinal ducts for passage of grease along the wall of the grease cup.

2. A grease cup having a valve seat at its rim and a supporting seat in its bottom, and an extensible capsule comprising two similar telescoping cups with valve forming ends, and a compression spring within the capsule normally holding the ends of the capsule cups against the seats, there being longitudinal corrugations in the walls of the capsule forming ducts for the passage of grease along the wall of the grease cup.

3. A grease cup having a valve seat in its rim and a supporting seat in its bottom, and an extensible capsule comprising two similar telescoping cups with valve forming ends and a compression spring within the capsule normally holding the ends of the capsule cups against the seats, there being ducts for the passage of grease along the walls of the grease cup, and grooves for the passage of grease through the bottom seat thereof.

4. The combination of a grease cup and a feed socket with flanges on the one and lugs on the other forming a bayonet joint, and a resilient packing in the socket extending around the sides and end portion of the grease cup and forming an air tight closure when clamped by the bayonet joint.

THOMAS E. ADKINS.